June 26, 1962

G. E. LEWIS 3,040,601

GEAR TRAIN

Filed Feb. 2, 1959

INVENTOR.
GEORGE E. LEWIS
BY Whittemore
Hulbert & Belknap
ATTORNEYS.

United States Patent Office 3,040,601
Patented June 26, 1962

3,040,601
GEAR TRAIN
George E. Lewis, 140 E. Wayne St., Dunkirk, Ohio
Filed Feb. 2, 1959, Ser. No. 790,565
9 Claims. (Cl. 74—740)

This invention pertains to a combination transmission, reducer, and differential which is arranged in a compact housing, has readily replaceable change gears to vary the over-all ratio between the input and output, has a completely non-slip drive throughout the combined stages between the input and output, and is capable of high performance and economy of operation.

It is an essential object of this invention to provide a transmission having coaxial and relatively rotatable pinion and main shafts with the main shaft having sliding gear means thereon, a countershaft which is driven by the pinion shaft and has gears attached thereto engageable with the sliding gear means on the main shaft, a reducer gear and pinion unit rotatably mounted on the countershaft with the reducer gear driven by the main shaft and the reducer pinion drivingly connected to a differential unit which applies a drive to each part of a split output shaft in such a manner that the output shafts are rotatable relative one another.

It is another object of this invention to provide in such an assembly a reducer shaft mounted between the countershaft and the output shafts with the reducer shaft having a second reducer gear and pinion unit fixed thereto wherein the second reducer gear is engageable with the first reducer pinion and the second reducer pinion is engaged with the differential unit so that added reduction is possible, the first and second reducer gears and the first reducer pinion being readily replaceable so that the over-all drive ratio between the input and output is correspondingly changed.

Another object of this invention is to provide in an assembly having such a pinion and main shaft, corresponding splines on the pinion shaft and the main shaft with a sliding internally splined member on the main shaft being engageable with both the splines on the main shaft and the pinion shaft to lock the shafts against relative rotation in an efficient manner with a simplified construction.

A further object is to provide in an assembly having such a differential unit, a pinion carrier with toothed portions formed on the outer circumference thereof for engagement with a driving gear, with each portion of the split output shaft having a sun gear attached thereto, axially staggered pinions rotatably carried by the pinion carrier so that at least one pinion is engaged with each sun gear and no pinion is engaged with both sun gears whereby a drive is provided to both sun gears and relative rotation is possible between the sun gears.

These and other objects will become more apparent when a preferred embodiment is described in connection with the drawings, in which:

FIG. 4 is a partial elevational view of the transmission selector end and the actuated sliding forks; and FIG. 5 is a partial top view of the transmission selector and the actuated sliding forks.

Figure 1:
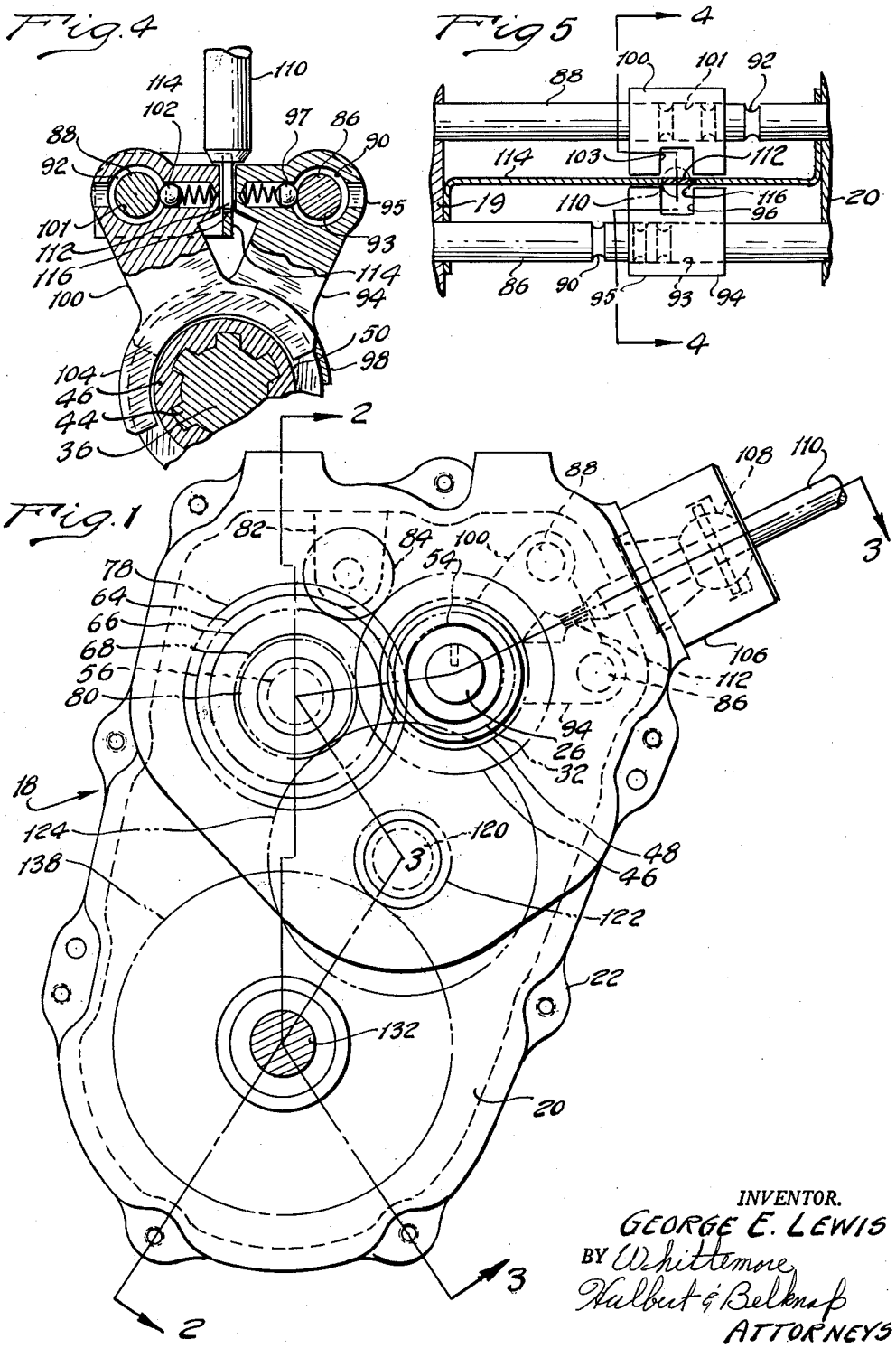
FIG. 1 is an end elevation of a preferred embodiment of this invention.

This invention provides in one compact unit the entire power transfer mechanism for a three-speed forward, one-speed reverse transmission, a reducing stage with replaceable reducing or change gears, and a differential gear assembly. The over-all drive ratio of this unit is changeable by replacing the gears in the reduction stage so that the same unit may be used for a large number of applications reducing production and assembly costs. Also, this unit has throughout positive drive characteristics with no belts or chains employed, thereby reducing slippage, and increasing economy and performance. This unit is especially adaptable to all small gasoline motorized equipment such as garden tractors, golf carts, sweepers, small racing cars, etc. In one easily installed unit is provided the complete drive between the power source and the wheels which drive includes a multiple speed transmission, a reducer stage, and a differential.

In the drawings is shown a housing 18 comprising two wall sections 19 and 20 which are bolted together as at 22. Journaled for rotation in wall 20 at 24 is a pinion or input shaft 26 which is slotted at 28 to receive the key from a motor driven pulley or the like, not shown. Shaft 26 is splined at its inner end 30 and carries in fixed relation thereon a power pinion 32, with an axial stub 34 extending inwardly from the shaft end. A main shaft 36 at one end is journaled for rotation at 38 in wall section 19 of housing 18 and has a socket 40 formed in the other end to rotatably support stub 34 through bearings 42. Shaft 36 has splines 44 formed longitudinally therealong which dimensionally correspond with the splines 30 on shaft 26. Carried on shaft 36 for sliding in a longitudinal direction are gears 46, 48 which have integral therewith annular slots 50, 52. Fixed at the end of shaft 36 is a reducer pinion 54.

Mounted parallel with main shaft 36 is a countershaft 56 which is journaled for rotation at 58 and 60 in the wall sections of housing 18. Countershaft 56 has a splined portion 62 on which are mounted drive gear 64, which is in constant meshed engagement with drive pinion 32, second and reverse gear 66, which is engageable with sliding gear 48, and low speed pinion 68 which is engageable with slidable gear 46. Gears 64 and 66 are maintained in longitudinal spaced relation by spacer collar 70, and gear 66 and pinion 68 are spaced by collar 72.

Shaft 56 has a smooth portion adjacent the left end thereof on which is rotatably journaled through bearing sleeves 74 gear unit 76 having a gear portion 78 which is in constant engagement with pinion 54 and which is splined or keyed to the teeth of pinion portion 80.

Figure 2:
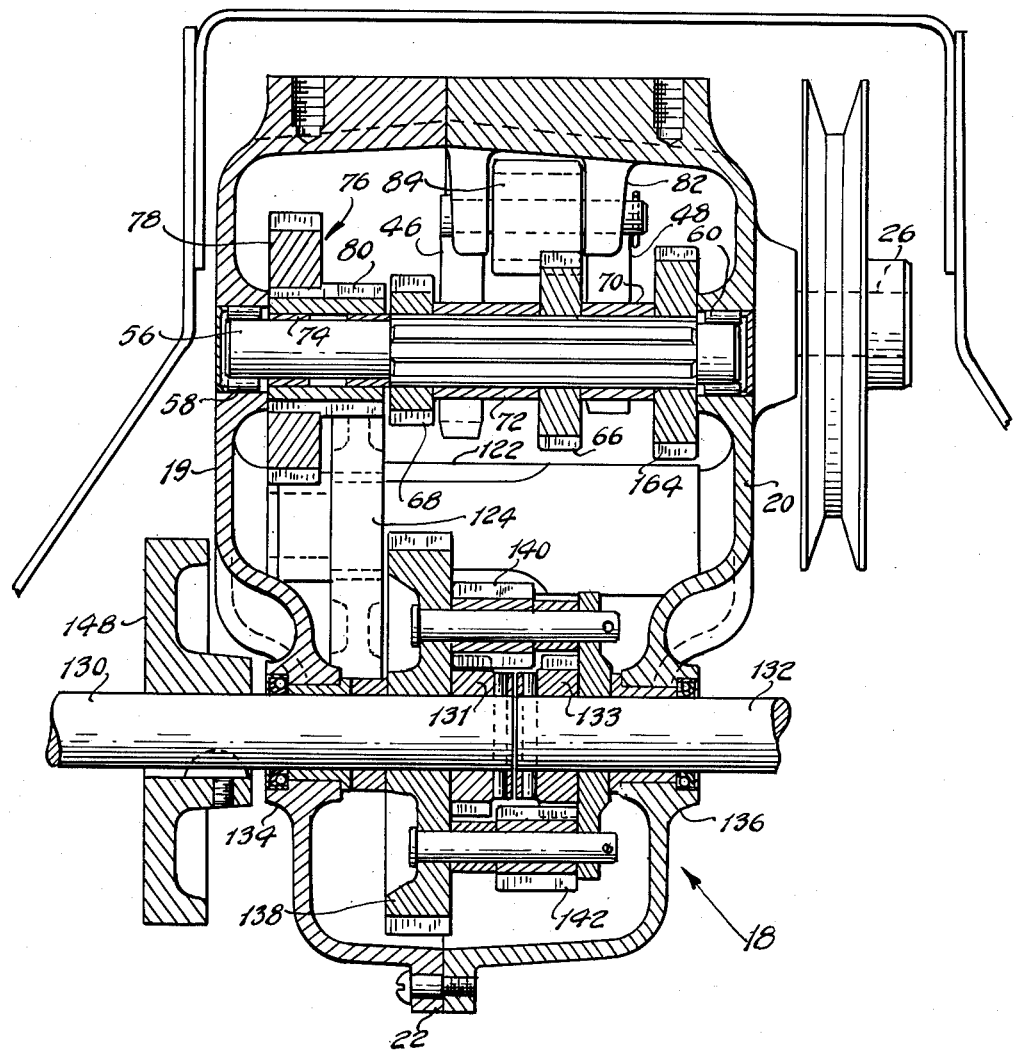
FIG. 2 is a section taken along 2—2 of FIG. 1.

Integral with the housing walls is a bifurcated extension 82 (FIG. 2) which rotatably supports in the arms thereof a reverse idler gear 84 which is in constant engagement with second and reverse gear 66 and which is engageable by sliding gear 46.

The means for sliding gears 46 and 48 will now be described. Fixed between opposite wall sections of housing 18 are a pair of locator rods 86, 88 which have formed therearound annular locater grooves 90, 92 respectively. Slidable on rod 86 is opening 93 of the head of a sliding fork 94 which has a spring loaded locater ball 97 mounted therein for engagement with locater groove 90 and has a yoke portion 98 which is in constant engagement with the annular slot 52 of gear 48. Formed in the head portion 95 of fork 94 is a transverse slot 96. In like manner, the head of a sliding fork 100 has formed therein an opening 101 which is in sliding engagement with locater rod 88 and has mounted therein a spring loaded locater ball 102 which is engageable with annular locating groove 92. Also formed in the head of sliding fork 100 is a transverse slot 103, FIGURE 5, which is similar to slot 96 in head 95 of sliding fork 94. Extending from the head of fork 100 is an arcuate yoke or fork portion 104 which is in constant engagement with the annular slot 50 of gear 46. It will be appreciated that movement of fork members 94 and 100 along their respective locator rods will respectively move gears 48 and 46 along the splined main shaft 36.

Figure 3:
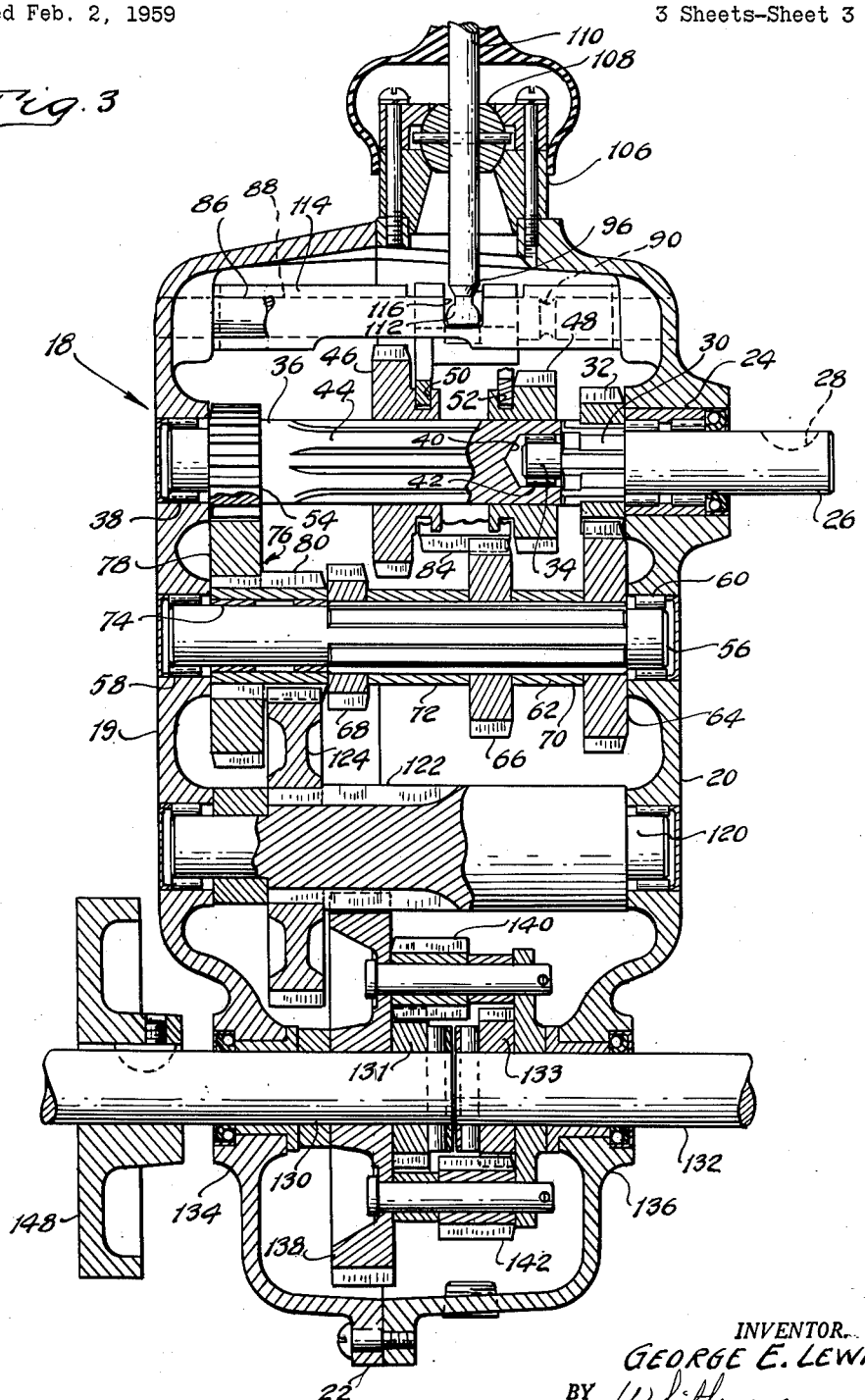
FIG. 3 is a section taken along 3—3 of FIG. 1.

The means for moving the sliding forks 94 and 100 will now be described. Upstanding from housing 18 is a universal joint support 106 which supports therein for universal movement a universal ball 108 which has fixed centrally therein a selector rod 110 which has a flattened selector end 112. Provided at the opposite end of lever 110 is a handle portion (not shown) which is manually operable to move lever 110. Lever 110 is movable longitudinally and tranversely of rods 86, 88 to separately engage and move sliding forks 94 and 100. Fixed between rods 86 and 88 and attached to opposite ends respectively thereof next to the walls of housing 18 as shown in FIGURES 3 and 5 is a guide plate 114 which has a notched portion 116 for receiving the lever end 112. Guide plate 114 serves to form and control the shifting pattern of lever 110. Double shifting of shifter forks 94 and 100 when selector lever 110 is in a neutral position is impossible when guide plate 114 is in place. When the end 112 of lever 110 is engaged with the notch 116 the selector lever is in neutral and can only be moved transversely of guide plate 114. In the neutral position, as shown in the drawings, transverse slot 96 of sliding fork 94 and the corresponding transverse slot in slide fork 100 are aligned with notch 116.

In the normal forward speed operation of the transmission selector mechanism, the lever is moved in a transverse direction from the neutral position shown, until end 112 engages transverse slot 96. A leftward longitudinal movement of end 112 will move fork 94 and sliding gear 46 in a leftward direction until gear 46 is engaged with pinion 68 of the countershaft 56 in which position the transmission is in a low forward drive. From this position the selector lever 110 may be moved until end 112 moves gear 46 rightwardly to a central position which would disengage gear 46 from pinion 68. The end 112 may be moved transversely through notch 116 until it is engaged with the transverse slot of sliding fork 100. A leftward movement of end 112 will now cause sliding fork 100 and gear 48 to move leftwardly until gear 48 is engaged with gear 66 of countershaft 56 at which time the transmission is in second forward gear. From this position, end 112 may be moved rightwardly, moving gear 48 rightwardly until it is engaged with the splines 30 on pinion shaft 26 at which time the pinion shaft 26 and main shaft 36 will be locked against relative rotation to provide a high or third forward speed.

To obtain reverse, end 112 is brought to neutral, moved through notch 116 and into engagement with the transverse slot 96 in the head of fork 94 and then end 112 is moved rightwardly moving gear 46 rightwardly until it is in engagement with reverse idler 84 at which time the transmission will be in reverse gear. Therefore, three forward speeds and a reverse speed are provided with the third forward speed resulting from the internal splined teeth of gear 48 mating with and in engagement with the splines 30 of shaft 26 and splines 44 of shaft 36 providing a simplified and efficient third forward speed drive.

Also journaled for rotation in opposite walls of housing 18 is a reducer shaft 120 which has gear teeth 122 formed on a portion thereof on which are sleeved the internal teeth of gear 124 with the external teeth of gear 124 in constant engagement with pinion 80.

The differential unit and output drive of this embodiment comprises an output shaft split into portions 130, 132 having fixed at adjacent ends sun gears 131, 133 respectively and which are journaled for rotation respectively at 134, and 136 in opposite walls of housing 18. Fixed to portion 130 is a pinion carrier 138 which is toothed along its outer circumference and drivingly engaged with the teeth 122 of reducer shaft 120. Carrier 138 carries rotatable pinions 140 and 142 which are in axially spaced relation so that pinion 140 is engaged only with sun gear 131, and pinion 142 is engaged only with sun gear 133. Also fixed to shaft 130 is a brake drum 148 and fixed to the outer ends of shafts 130 and 132 are wheels or other suitable output members, not shown.

In the operation of the differential unit, the carrier 138 is driven through rotation of reducer shaft 120 since it is engaged with the teeth 122 thereon. This imparts rotation to the planet pinion axes to drive shafts 130, 132 through sun gears 131, 133 respectively. Relative rotation is made possible between shafts 130, 132 due to this arrangement so that in turning corners and in other driving operations where one driving wheel is required to turn at a different speed than the other, there will be freedom for independent wheel movement.

In the over-all operation of the unit, input is applied at pinion shaft 26 which is transferred to countershaft 56 through pinion 32 and gear 64. Then, depending on the position of sliding gears 46 and 48 as previously explained, the drive from countershaft 56 is transferred in a predetermined ratio and direction to main shaft 36 where the drive is transferred from pinion 54 to gear 78 of gear unit 76. This rotates pinion 80 which imparts a drive, in reduced ratio, to gear 124 of reducer shaft 120 with a further reduction in drive being transferred from teeth 122 of shaft 120 to the teeth of carrier 138 where a differential drive is applied to shafts 130, 132, as previously explained.

An important feature of this invention is that pinion 54, gear unit 76, and gear 124 may be selected as desired during assembly of the unit, and, if desired, replaced after assembly of the unit, to provide a wide range of reduction ratios between main shaft 36 and carrier 138. In this manner, the same unit is adaptable for any one of a number of applications and in each application, such as a tractor drive, the reduction ratio can be suited to particular conditions, such as tractor wheel size and tractor power requirements. This is all made possible without the use of belts and pulleys or other drives having slip characteristics since the drive from input shaft 26 to output shafts 130, 132 is entirely through non-slip gears. This is especially advantageous in the use of motorized equipment which is subject to heavy loads and hill climbing where a tendency to slip would hinder vehicle travel and make a power transfer unit unsatisfactory. This unit therefore combined the advantages of flexibility in reduction ratio, compactness, a positive drive between input and output shafts, and increased efficiency and economy of performance.

What I claim as my invention is:

1. A vehicle multiple ratio transmission, reducer and differential comprising an input shaft carrying an input pinion, a splined main shaft mounted coaxially with said input shaft and rotatable relative thereto, gear means being mounted to and slidable along said main shaft, a first reducer pinion being fixed to said main shaft, a pair of fixed supports, a countershaft being journaled for rotation to said fixed supports in parallel relation to said main shaft and carrying a gear meshed with said input pinion, said countershaft also carrying gear means engageable with said sliding gear means, said countershaft rotatably supporting at one end a first reducer gear member and second reducer pinion with the reducer gear enmeshed with said first reducer pinion, said first reducer gear having internal tooth portions secured to an end portion of said second reducer pinion, a reducer shaft rotatably mounted in substantial parallelism with said main shaft and having tooth formations formed along one end thereof to form a third reducer pinion, a second reducer gear having internal tooth portions secured to said third pinion tooth portions and enmeshed with said second reducer pinion, a pair of axially aligned output shafts in substantial parallelism with said input shaft each having a sun gear formed thereon, one of said output shafts having a planet pinion carrier which rotatably supports a plurality of planet pinions, said carrier having a toothed outer circumference engaged with said third reducer pinion, said planet pinions being axially staggered so that at least one planet pinion is engaged with each output sun gear, said first and second reducer gears and said first and second reducer pinions being replaceable to change gear ratios.

2. Selector means comprising a pair of parallel spaced apart rods rigidly mounted at the ends thereof, a selector fork slidably mounted on each rod, lever means operably associated with said forks to selectively move either of said forks in either direction along the rod the fork is mounted on, and a stationary guide plate positioned between the forks on the rods operable to prevent said lever from moving both of said forks at once.

3. Selector means comprising a pair of parallel spaced apart rods rigidly mounted at the ends thereof, a selector fork slidably mounted on each rod and having a neutral position on the rod, lever means operably associated with said forks to selectively move either of said forks in either direction from the neutral position along the rod the fork is mounted on, and a stationary guide plate comprising a band of relatively rigid material positioned between said rods and the forks mounted thereon and having a notch therein opposite the neutral position of the forks for allowing one end of the lever to pass from one fork to the other.

4. Selector means comprising a pair of parallel spaced apart rods rigidly mounted at the ends thereof, a selector fork slidably mounted on each rod and having a neutral position on the rod, lever means operably associated with said forks to selectively move either of said forks in either direction from the neutral position along the rod the fork is mounted on, and a stationary guide plate comprising a band of relatively rigid material positioned between said rods and the forks mounted thereon and having a notch therein opposite the neutral position of the forks for allowing one end of the lever to pass from one fork to the other, the ends of said band extending perpendicularly thereto in opposite directions and having openings therein through which said rods are passed.

5. Structure as claimed in claim 1 and further including selector means for moving said slidable gear means along said main shaft into selective engagement with the gear means on said countershaft, comprising a pair of parallel spaced apart rods rigidly mounted at the ends thereof, a selector fork slidably mounted on each rod, lever means operably associated with said forks to selectively move either of said forks in either direction along the rod the fork is mounted on, and a guide plate mounted on said selector means and operable to prevent said lever from moving both of said forks at once.

6. Structure as claimed in claim 5 wherein said guide plate comprises a band of relatively rigid material positioned between said rods and the forks mounted on the rods and having a notch therein for allowing one end of the lever to pass from one fork to the other.

7. A vehicle multiple ratio transmission, reducer and differential for use with motorized equipment such as golf carts, sweepers and similar devices having low horse power outputs comprising an input shaft carrying an input pinion, a splined main shaft mounted coaxially with said input shaft and rotatable relative thereto, gear means splined to and slidable along said main shaft, a first reducer pinion fixed to said main shaft, a pair of fixed supports, a countershaft journaled for rotation to said fixed supports in parallel relation to said main shaft and carrying a gear in mesh with said input pinion, gear means mounted on said countershaft for rotation therewith engageable with said sliding gear means, a reducer gear member and a second reducer pinion rotatably supported on one end of said countershaft with the reducer gear enmeshed with said first reducer pinion, said first reducer gear having internal tooth portions secured to an end portion of said second reducer pinion, a pair of axially aligned output shafts in substantial parallelism with the input shaft, each having a sun gear formed thereon, one of said output shafts having a planet pinion carrier which rotatably supports a plurality of planet pinions, means engaged with said second reducer pinion for driving said carrier, said planet pinions being axially staggered so that at least one planet pinion is engaged with each output sun gear.

8. A vehicle multiple ratio transmission, comprising an input shaft carrying an input pinion, a splined main shaft mounted coaxially with said input shaft and rotatable relative thereto, gear means splined to and slidable along said main shaft, a first reducer pinion fixed to said main shaft, a pair of fixed supports, a countershaft journaled for rotation to said fixed supports in parallel relation to said main shaft and carrying a gear in mesh with said input pinion, gear means mounted on said countershaft for rotation therewith engageable with said sliding gear means, a reducer gear member and a second reducer pinion secured together and rotatably supported on one end of said countershaft with the reducer gear enmeshed with said first reducer pinion, a pair of axially aligned output shafts in substantial parallelism with the input shaft, each having a sun gear formed thereon, one of said output shafts having a planet pinion carrier which rotatably supports a plurality of planet pinions, means engaged with said second reducer pinion for driving said carrier, said planet pinions being axially staggered so that at least one planet pinion is engaged with each output sun gear.

9. A vehicle multiple ratio transmission comprising an input shaft carrying an input pinion, a splined main shaft mounted coaxially with said input shaft and rotatable relative thereto, gear means splined to and slidable along said main shaft, a first reducer pinion fixed to said main shaft, a pair of fixed supports, a countershaft journaled for rotation to said fixed supports in parallel relation to said main shaft and carrying a gear in mesh with said input pinion, gear means mounted on said countershaft for rotation therewith engageable with said sliding gear means, a reducer gear member and a second reducer pinion secured together and rotatably supported on one end of said countershaft with the reducer gear enmeshed with said first reducer pinion, an axially aligned output shaft in substantial parallelism with the input shaft, means operable between said second reducer pinion and output shaft for producing rotation of said output shaft on rotation of said second reducer pinion, and selector means for selectively engaging predetermined gears on said main shaft and countershaft comprising a pair of parallel spaced apart rods extending substantially parallel to and positioned adjacent the main shaft, a selector fork engageable with a gear on said main shaft slidably mounted on each rod, lever means operably associated with said forks to selectively move either of said forks in either direction along the rod the fork is mounted on, and a stationary guide plate positioned between the forks on the rods operable to prevent said lever from moving both of said forks at once.

References Cited in the file of this patent

UNITED STATES PATENTS

| | | |
|---|---|---|
| 1,173,964 | Herman | Feb. 29, 1916 |
| 2,051,980 | Bachman | Aug. 25, 1936 |
| 2,195,479 | Buchner | Apr. 2, 1940 |
| 2,214,805 | Baker | Sept. 17, 1940 |
| 2,379,021 | Marchak | June 26, 1945 |
| 2,686,435 | Luce | Aug. 17, 1954 |
| 2,776,583 | Williams | Jan. 8, 1957 |
| 2,808,738 | Bartell | Oct. 8, 1957 |